(12) United States Patent
Ye et al.

(10) Patent No.: US 9,600,671 B2
(45) Date of Patent: Mar. 21, 2017

(54) SYSTEMS AND METHODS FOR ACCOUNT RECOVERY USING A PLATFORM ATTESTATION CREDENTIAL

(71) Applicant: Intel Corporation, Santa Clara, CA (US)

(72) Inventors: Ting Ye, Shanghai (CN); Qin Long, Shanghai (CN); Vincent Zimmer, Federal way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/164,398

(22) Filed: May 25, 2016

(65) Prior Publication Data
US 2016/0267276 A1    Sep. 15, 2016

Related U.S. Application Data

(63) Continuation of application No. 13/995,238, filed as application No. PCT/CN2013/072520 on Mar. 13, 2013, now Pat. No. 9,378,371.

(51) Int. Cl.
*G06F 21/57* (2013.01)
*G06F 21/45* (2013.01)

(52) U.S. Cl.
CPC .......... *G06F 21/575* (2013.01); *G06F 21/45* (2013.01); *G06F 2221/034* (2013.01); *G06F 2221/2117* (2013.01); *G06F 2221/2131* (2013.01)

(58) Field of Classification Search
None
See application file for complete search history.

(56) References Cited

U.S. PATENT DOCUMENTS

| 8,219,806 B2 * | 7/2012 | Okuyama | G06F 21/57 173/164 |
| 9,021,244 B2 * | 4/2015 | Bobzin | G06F 21/575 713/1 |
| 2004/0039946 A1 * | 2/2004 | Smith | H04L 63/083 726/6 |
| 2005/0149729 A1 | 7/2005 | Zimmer et al. | |

(Continued)

FOREIGN PATENT DOCUMENTS

| CN | 101742499 A | 6/2010 |
| CN | 101977383 A | 2/2011 |

OTHER PUBLICATIONS

International Search report and Written Opinion received for PCT Patent Application No. PCT/CN2013/072520, mailed on Dec. 12, 2013, 10 pages.

(Continued)

*Primary Examiner* — Michael R Vaughan
(74) *Attorney, Agent, or Firm* — Grossman, Tucker, Perreault & Pfleger, PLLC

(57) ABSTRACT

Described herein is technology for restoring access to a user account. In particular, systems and methods for account recovery using a platform attestation credential are described. In some embodiments, the platform attestation credential is generated by an authentication device in a pre boot environment. A first copy of the platform attestation credential may be bound by an account management system to a user account. Access to the user account may subsequently be restored using a second copy of the platform attestation credential.

21 Claims, 3 Drawing Sheets

(56) References Cited

U.S. PATENT DOCUMENTS

| | | | |
|---|---|---|---|
| 2006/0077426 A1 | 4/2006 | Lovat et al. | |
| 2006/0161784 A1* | 7/2006 | Hunter | G06F 21/575 713/182 |
| 2008/0028235 A1* | 1/2008 | Smith | G06F 21/575 713/190 |
| 2009/0271618 A1* | 10/2009 | Camenisch | G06F 21/445 713/155 |
| 2011/0066839 A1* | 3/2011 | Wang | G06F 21/575 713/2 |
| 2011/0138166 A1* | 6/2011 | Peszek | G06F 21/575 713/2 |
| 2011/0154023 A1* | 6/2011 | Smith | G06F 21/78 713/155 |
| 2012/0179904 A1 | 7/2012 | Dunn et al. | |

OTHER PUBLICATIONS

Honan, "The New York Times is Wrong: Strong Passwords Can't Save Us", Nov. 15, 2012. available at http://www.wired.com/2012/11/why-no-password-is-safe-from-hackers/.
International Preliminary Report on Patentability received for PCT Patent Application No. PCT/CN2013/072520, issued on Sep. 15, 2015.
U.S. Appl. No. 13/995,238, filed Jun. 18, 2013.
Extended European Seach Report issued in European Application No. 13877598.6, dated Oct. 4, 2016, 8 pages.

\* cited by examiner

SYSTEMS AND METHODS FOR ACCOUNT RECOVERY USING A PLATFORM ATTESTATION CREDENTIAL

CROSS REFERENCE TO RELATED APPLICATIONS

This application is a Continuation of U.S. application Ser. No. 13/995,238 filed Jun. 18, 2013, which is a National Stage Entry of PCT/CN2013/072520 filed Mar. 13, 2013, both of which are incorporated by reference in their entirety.

FIELD

The present disclosure relates generally to account recovery and, in particular, to systems and methods for account recovery that utilize a platform attestation credential.

BACKGROUND

People are increasingly using online services such as electronic mail, online banking, social networks, and instant messaging. In many instances an individual (hereafter, user) wishing to use such services will establish an account with a relevant service provider. The account may be associated with a user name and protected by a password, both of which are known to the user and shared with the service provider. When a user wishes to access the account, he/she may enter the username and password into a relevant login portal, such as a website. The service provider may then compare the entered username and password combination with username and password combinations stored by the service provider. Assuming the entered username and password match the login information stored by the service provider, the user is granted access to his/her account.

While password authentication mechanisms such as the one described above are useful, users often forget the login information (username, password, etc.) needed to access their accounts. This may be particularly true in instances where a user has many different accounts and/or has selected a password that is complex and/or hard to guess (and thus hard to remember). In addition, hackers and/or malware may attempt to gain access to user accounts by snooping or otherwise obtaining the relevant username and password associated with such accounts. Should this occur, the malware and/or hacker may gain access to a user's account(s) and change the password. For these and other reasons, users may lose access to his or her account.

A user who has lost access to an account may attempt to regain access to the account using an account recovery service. In a common scenario, the account recovery service will ask the user for information or other inputs that allow the system to verify the identity of the user. For example, an account recovery service may ask the user a series of questions based on personal private information (e.g., phone number, identification number, social network information, etc.) that the user previously provided to the account recovery service, e.g., during creation of the account in question. Assuming the inputs received by the user match the recovery service's records, the recovery service may restore access to the account.

While existing account recovery services are useful, users may not wish to share certain information with an account recovery service. This may be particularly true when the information requested by the account recovery service is personal private information, and/or if the individual does not trust the service provider. Users may also fear that their personal information may become compromised by malware, a hacker, or some other entity that may target the service provider's account recovery system.

Figure 1:
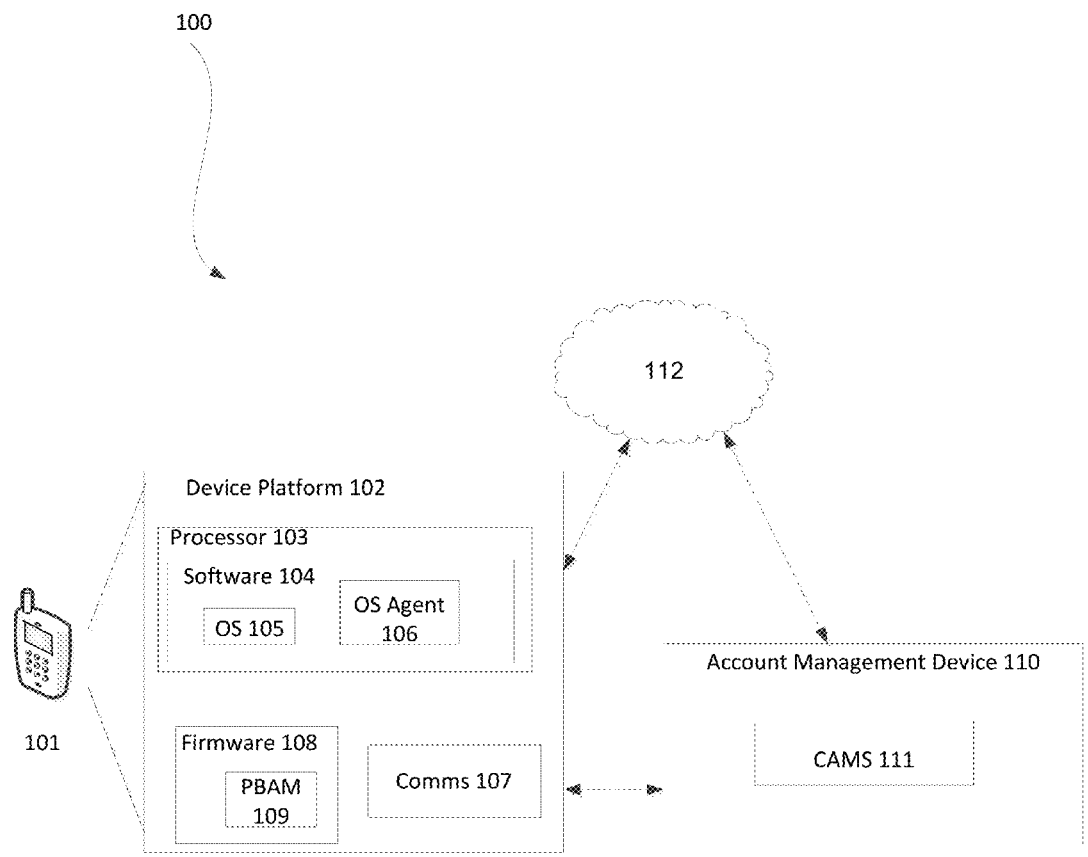
FIG. 1 is a block diagram of an exemplary system consistent with the present disclosure.

Although the following Detailed Description will proceed with reference being made to illustrative embodiments, many alternatives, modifications, and variations thereof will be apparent to those skilled in the art.

DETAILED DESCRIPTION

As discussed in the Background, a user may lose access to his/her online accounts for a variety of reasons such as password loss, the activities of a hacker/malware, combinations thereof, and the like. Although existing account recovery systems may enable the user to regain access to his/her accounts, such systems often rely on personal private information that the user may not wish to share with a service provider or other untrusted entity. As will be evident from the following description, one advantage of the technologies described herein is that they may enable restoration of user accounts without the use of a user's personal private information. By way of overview, the present disclosure is generally directed to systems and methods that enable user account recovery with a platform attestation credential. Generally, the system includes an authentication device and an account management device. The authentication device may be configured to initiate account recovery operations, generate and/or store platform attestation credentials (PACs), and transmit a PAC to the account management device. The account management device may be configured to bind (i.e., associate) a first copy of a platform attestation credential with an appropriate user account, verify a subsequent copy of the platform attestation credential against the first copy and, if appropriate, transmit account restoration information to the authentication device or another appropriate location.

As used herein, the term "authentication device" refers to any of the large number of electronic devices that may be used to initiate account recovery operations, generate PACs, and transmit a PAC to an account management device. Any type of mobile or other electronic device capable of performing those functions may be used as an authentication device in the present disclosure. Non-limiting examples of such devices include mobile and/or non-mobile devices, such as cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, the authentication devices described herein are preferably in the form of one or more cell phones, desktop computers, laptop computers, servers, smart phones and tablet personal computers.

As used in this application and in the claims, a list of items joined by the term "and/or" can mean any combination of the listed items. For example, the phrase "A, B and/or C" can mean A; B; C; A and B; A and C; B and C; or A, B and C.

Although any type of electronic device may be potentially used to generate a PAC consistent with the present disclosure, without limitation and for practical purposes the device used to generate a PAC is preferably chosen from devices that are trusted by and/or accessible to a legitimate owner of an account that is the subject of an account restoration request. For example, the device used to generate a PAC may be selected from a cell phone, smart phone, laptop computer, desktop computer, tablet personal computer, combinations thereof and the like, which are owned or otherwise trusted by/accessible to the legitimate owner of an account that is the subject of an account restoration request.

As used herein the term "module" may refer to software, firmware and/or circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded in (e.g., nonvolatile) memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously.

Accordingly, one aspect of the present disclosure relates to an account recovery system. Reference is therefore made to FIG. 1, which depicts exemplary system architecture of an account recovery system in accordance with the present disclosure. As shown, account recovery system 100 (hereafter, system 100) includes device 101 and account management device 110. For the sake of illustration, device 101 has been illustrated as a smart phone. It should be understood, however, that device 101 may be any type of mobile or other electronic device that is suitable for serving as an authentication device, such as those previously described. Accordingly, the terms "device 101" and "authentication device 101" are used interchangeably herein. Without limitation authentication device 101 is preferably a cellular phone, smart phone, tablet personal computer, desktop computer, or laptop computer.

Authentication device 101 includes device platform 102. In the illustrated embodiment, device platform 102 may be in the form of a smart phone platform, as authentication device 101 has been illustrated as a smart phone. However, it should be understood that device platform 102 may take another form, which may generally correspond to the form factor of authentication device 101. Accordingly, device platform 102 may be a device platform corresponding to one or more of the mobile or other electronic devices noted above as being suitable for use as an authentication device. Without limitation, device platform 102 is preferably in the form of a cellular phone platform, smart phone platform, tablet personal computer platform, desktop computer platform, or laptop computer platform.

As shown, device platform 102 includes processor 103. Processor 103 may be any suitable type of processor, such as a general purpose processor having one or more processing cores, an application specific integrated circuit, another type of processor, or combinations thereof. Non-limiting examples of processors that may be used as processor 103 include the processors produced by Intel® Corporation, Advanced Micro Devices Corporation, and Nvidia® Corporation.

Processor 103 may execute software 104 such as operating system 105 (hereinafter, OS 105) and operating system agent 106 (hereinafter, OS agent 106). OS 105 and OS agent 106 may be stored in a memory (not shown) that is integral or otherwise accessible to processor 103. For example, OS 105 and OS agent 106 may be stored in a mass storage device or other memory device within or coupled to device platform 102. Non-limiting examples of such memory include one or more of the following memory types: read only memory, electrically programmable memory, random access memory, flash memory (which may include, for example, NAND or NOR type memory structures), magnetic disk memory, and/or optical disk memory. Additionally or alternatively, such memory may include other and/or later-developed types of computer-readable memory.

As discussed below, OS 105 and/or OS agent 106 may be stored in a memory that is the same or different than that of a pre boot authentication module (PBAM), as discussed below. Thus for the sake of clarity, memory storing the OS 105 and/or OS agent 106 may be referred to herein as a "first memory."

Device platform 102 may further include communications circuitry 107 (hereinafter, COMMS 107). COMMS 107 may be any type of circuitry that is that is capable of sending and receiving information from and with device 101. For example, COMMS 107 may include an antenna, a transmitter, a receiver, a transceiver, a transponder, a network interface device (e.g., a network interface card), combinations thereof, and the like. Accordingly, COMMS 107 may be capable sending and/or receiving data signals using one or more wired or wireless communications protocols, such as may be used with a close range communications network, a long range communications network, or a combination thereof. As will be described later, COMMS 107 may in some embodiments be accessible by processor 103 or another processor in a pre-boot environment, thus enabling device 101 to send and receive data signals in such environment.

The phrase "close range communication network" is used herein to refer to one or more technologies for sending/receiving data signals between devices that are relatively close to one another. Close range communication occurs over a close range communication network and includes, for example, communication between devices using a BLUETOOTH™ network, a personal area network (PAN), near field communication (NFC), a ZigBee network, a wired Ethernet connection, combinations thereof, and the like. In contrast, the phrase "long range communication network" is used herein to refer to technologies for sending/receiving data signals between devices that are a significant distance away from one another. Long range communication occurs over a long range communication network and includes for example, communication between devices using a WiFi network, a wide area network (WAN) (including but not limited to a cell phone network (3G, 4G, etc. and the like), the internet, telephony networks, combinations thereof, and the like.

Device platform 102 may further include non-volatile memory (NVM) 108, which may store pre boot authentication module (PBAM) 109. Accordingly, the combination of NVM 108 and PBAM 109 may be understood as firmware of authentication device 101. NVM 108 may be any type of non-volatile memory, including but not limited to the memory types specified above as being suitable as a first memory for storing OS 105 and OS agent 106. Without limitation, NVM 108 is preferably a read only memory, a flash memory, or a combination thereof. In some embodiments, NVM 108 is memory that is integral with or otherwise coupled to device platform 102. As discussed previously, OS 105 and OS agent 106 may be stored on a different (e.g., first) memory than PBAM 109. Thus for the sake of clarity, memory used to store PBAM 109 (e.g., NVM 108) may be referred to herein as a "second memory."

Account management device 110 may be in the form of one or more electronic devices, such as those previously described above in connection with the authentication devices described herein. Thus for example account management device 110 may be in the form of a mobile and/or non-mobile device, such as a computer terminal, desktop computer, kiosk, netbook computer, notebook computer, internet device, payment terminal, network server, tablet personal computer, ultra-mobile personal computer, combinations thereof, and the like. Without limitation, the account management device is preferably in the form of one or more network servers, such as but not limited to enterprise servers, internet (cloud) servers, combinations thereof, and the like. In any case, account management device may be configured to perform account management functions consistent with the present disclosure.

Accordingly, account management device 110 may include a processor, memory, and communications circuitry, which for the sake of clarity and ease of understanding are not shown in FIG. 1. The nature and type of such components is the same as the corresponding components of authentication device 101 described above, and thus a detailed description of such components is not reiterated here. As shown in FIG. 1, account management device 110 further includes credential authentication module (CAM) 111, which may be stored in a memory (again, not shown) of account management device 110. CAM 111 may include computer readable instructions that when executed by a processor of account management device 110 cause such system to perform account management and restoration operations consistent with the present disclosure.

Authentication device 101 and account management device 110 may communicate with one another directly or indirectly using a close range communications network, a long range communications network, or a combination thereof. For example, authentication device 101 and account management device may communicate directly with one another using a close range communications network, such as those previously described. This concept is illustrated by the hashed double arrow line connecting device platform 102 with account management device 110. Alternatively or additionally, authentication device 101 and account management device 110 may communicate indirectly via a long range communication network. This concept is illustrated in FIG. 1 by the hashed double arrows connecting authentication device 101 and account management device 110 with network 112, which may be one or more long range communications networks such as the internet. Accordingly, COMMS 107 may be configured to permit authentication device 101 to communicate with account management device 110 (or more specifically, with communications circuitry of account management device 110) via a close range communication network, long range communication network, or a combination thereof.

As mentioned previously, authentication device 101 may function to generate and/or store a platform attestation credential (PAC), and/or transmit a PAC to account management device 110 in support of one or more account recovery operations consistent with the present disclosure. The terms "platform attestation credential" and "PAC" are interchangeably used herein to refer to an electronic identifier that may be used to attest the identity of an account owner and/or the account owner's legitimate ownership of an account to an account management device of a relevant service provider.

A PAC may be generated from identifying indicia, user inputs, other information, or a combination thereof. The identifying indicia may be specific to the device generating the PAC or components of such device. For example, a PAC may be generated from identifying indicia corresponding to components of an authentication device, such as the authentication device's main firmware footprint, hardware identities of its constituent components (e.g., its processor identification number, a serial number of a video display component such as a video card, etc.), a trusted platform module (TPM) key, a media access control (MAC) address, a mobile identifier, combinations thereof, and the like. In some embodiments, a PAC consistent with the present disclosure may be generated by combining, intermixing, or otherwise modifying one or more of such identifying indicia in a predetermined manner, such as in accordance with a predetermined algorithm and/or other mathematical operation. For example, a PAC may be calculated by hashing one or a combination of hardware identities using a cryptographic hash function such as secure hashing algorithm 256 (SHA-256) or SHAR-512, and using the hashed value as the PAC.

User input may also be incorporated in the generation of a PAC. For example, a user may select certain components, identifying indicia, etc. that are to be used in the generation of a PAC. Alternatively or additionally, user inputs such as a keystroke pattern, one or more words, biometric information, etc. may be combined with identifying indicia associated with the device used to generate a PAC. In this way, the systems and methods of the present disclosure may create a unique and/or user specific PAC, regardless of whether the device used to generate the PAC has a hardware configuration that is utilized in numerous other devices. User inputs affecting PAC generation may be input through a user interface and stored in a user profile (both described later), such that they may be later recalled to produce additional copies of a PAC at a later time.

PAC generation may occur at any suitable time and within any suitable environment. For example, a PAC may be generated by authentication device 101 during operating system (OS) runtime, i.e., during the execution of OS 105 by processor 103. Accordingly, OS agent 106 may include computer readable instructions that when executed by processor 103 during OS runtime causes authentication device 101 to generate a PAC consistent with the present disclosure. OS agent may also include instructions that when executed cause authentication device 101 to produce a user interface capable of receiving user inputs, e.g., on a display.

While the production of a PAC during OS runtime is useful, PAC generation processes executed in an OS environment may be subject to compromise by a hacker, malware resident in or executed within the OS, or another unauthorized entity. To address one or more of these concerns, the authentication devices described herein may be configured to independently produce a PAC outside of an OS runtime environment. For example, the authentication devices herein may be configured to produce a PAC in a pre-boot environment, i.e., prior to booting an operating system of an authentication device. Non-limiting examples of suitable pre boot environments include pre boot environments that may be produced using a basic input output system (BIOS), a uniform extensible firmware interface (UEFI), combinations thereof, and the like. Without limitation, the authentication devices described herein are preferably configured to produce a PAC in a secure pre boot environment, such as a secure pre boot environment that may be provisioned with a UEFI. As may be appreciated, by conducting PAC generation in a pre-boot environment, such process may not be subject to compromise by malware, a hacker, or some other unauthorized entity that be resident on or have access to system 100 via OS 105.

PAC generation by authentication device 101 may be instigated by OS agent 106. In this regard, OS agent 106 may include computer readable instructions that when executed by a processor (e.g., processor 103) may initiate a PAC pre boot generation process. Initiation of the PAC pre boot generation process may be in response to a user input made through a user interface provided by OS 105, OS agent 106 and/or another component. For example, in response to a user input the OS agent instructions when executed may cause authentication device 101 to reboot and initiate a pre boot environment, such as may be provided by the execution of a BIOS interface or UEFI that may be stored as firmware (not shown) on device platform 102. Within this pre boot environment, control may transfer to a pre boot authentication module (hereinafter, PBAM), such as PBAM 109 in FIG. 1, which is executed within such environment, e.g., by processor 103 or another processor.

As noted previously, PBAM 109 is stored in NVM 108 of device platform 102 and may therefore be regarded as firmware that may be executed within a pre boot environment by processor 103 or another processor (not shown) of authentication device 101. For example, PBAM 109 may include or be in the form of BIOS and/or UEFI firmware that is executed within a pre boot environment, i.e., prior to the boot of OS 105. Without limitation, PBAM 109 is preferably in the form of UEFI firmware that includes one or more UEFI drivers and/or components that may be executed in a UEFI pre boot environment.

Accordingly, PBAM 109 may include computer readable instructions that when executed cause authentication device 101 to perform PAC generation and/or transmission operations consistent with the present disclosure. For example, the PBAM instructions when executed may cause authentication device 101 to generate a PAC, e.g. from identifying indicia of authentication device 101 (and/or its constituent components), user inputs, or a combination thereof as previously described. Without limitation the PBAM instructions when executed preferably cause authentication device 101 to produce a PAC solely from identifying indicia of authentication device 101, or from a combination of user input and identifying indicia of device 101.

PBAM 109 may further include computer readable instructions that when executed cause authentication device 101 to produce a user interface (not shown). In some embodiments, execution of the PBAM instructions may cause the user interface to appear on a display, such as a display (not shown) of authentication device 101. The user interface may be configured to facilitate the collection and storage of user and/or other inputs, which may be used to govern or otherwise impact PAC generation and/or PAC transmission to account management device 110. For example, the user interface may be configured to record keystrokes entered by a user, textual information, user preferences as to the identifying indicia to be used in the generation of a PAC, combinations thereof, and the like. Such inputs may be stored in a memory (not shown) of authentication device 101, e.g., in the form of a user profile. Information in the user profile may be used by PBAM 109 to control or otherwise impact the initial production of a PAC, e.g., a PAC first copy as described later. Likewise, information in the user profile may be recalled by authentication device 101 to control or otherwise impact the subsequent production of a copy of the PAC, such as a PAC second copy (described later) which may be used in a PAC update operation or an account recovery operation.

The user interface may also be configured to enable a user to input account information, and to record or otherwise associate such account information with a PAC or factors (identifying indicia, etc.) used to produce a PAC. For example, a user may input account information relevant to an account that he/she has with a particular service provider, and a PAC (or other factors used to create a PAC) may be associated with that account information and stored in the user profile. Thus for example authentication device 101 may generate a first PAC that is associated with a first user account, a second PAC that is associated with a second user account, and so forth. Information (user inputs, identifying indicia, etc.) used to produce the first and second PACs may be stored in the user profile in association with information identifying the first and second user accounts, respectively. As a result, the systems and methods of the present disclosure may produce account specific PACs. Of course, more than one PAC may be affiliated with a single account, e.g., to enhance security of that account or for another purpose.

PBAM 109 may further include computer readable instructions that when executed may cause authentication device 101 to transmit a PAC to account management device 110, e.g., in support of a PAC binding operation and/or an account recovery operation consistent with the present disclosure. Communication of a PAC from authentication device 101 to account management device 110 may be performed by COMMS 107 in any suitable manner, such as via a close range communication network, a long range communication network, or a combination thereof, as previously described. In some embodiments, the PBAM instructions when executed cause authentication device to transmit a PAC to account management device 110 while authentication device 101 is still in a pre-boot environment. Alternatively, the PBAM instructions when executed may cause authentication device to boot OS 105 after PAC generation. Once OS 105 has booted, control may transfer to OS agent 106. In such instances, the OS agent instructions may cause authentication device 101 to transmit the PAC to account management device 110, from with an OS runtime environment.

For enhanced security or another purpose, the PBAM instructions and/or OS agent instructions when executed may impose one or more security protocols on the generation of a PAC by authentication device 101 and/or on the transmission of a PAC to account management device 110. For example, such instructions when executed may cause authentication device 101 to require verification of user identity and/or presence, prior to PAC generation and/or PAC transmission to account management device 110. Verification of user identity may occur in any suitable manner. For example, the PBAM and/or OS agent instructions when executed may cause authentication device 101 to prompt entry of a user password, personal identification number, keystroke pattern, biometric information, combinations thereof, and the like.

Verification of user presence (i.e., the presence of a user at authentication device 101) may also occur in any suitable manner. For example, the PBAM instructions and/or OS agent instructions when executed may cause authentication device 101 to prompt a user to engage in an activity that produces a detectable signal, e.g., to speak, type, move an input device (not shown) coupled to authentication device 101, combinations thereof and the like. Such instructions when executed may further cause authentication device 101 to monitor for the detectable signal produced by the prompted user activity, e.g., using one or more sensors (e.g., a camera, microphone, etc. all not shown) attached thereto.

Failure of authentication device 101 to validate user identity and/or presence may signify that a request to generate and or transmit a PAC was initiated by malware, a hacker, or some other unauthorized party. In such instances, the PBAM instructions and/or OS agent instructions when executed may prevent PAC generation and/or transmission by authentication device 101. If authentication device 101 is successfully able to verify user identity and/or presence however, such instructions when executed may allow PAC production and/or transmission to proceed in the manner previous described.

Account management device 110 may manage access and/or access recovery to user accounts (not shown) associated with one or more services provided by a service provider. For example, a service provider may provide electronic mail, social media, other services, combinations thereof, and the like to a plurality of users, wherein each user is affiliated with one or more separate user accounts. In such instances, account management device 110 may maintain a database (not shown) of individual user accounts for such service provider, as well as login information relevant to each account (e.g., usernames, passwords, contact information, etc.).

Regardless of the nature of the services, account management device 110 may be configured to bind a PAC to a user account within a user account database in a PAC binding operation. Such PAC binding operation may be initiated by OS agent 106 and/or PBAM 109, e.g., in response to a user input. For example, OS agent 106 and/or PBAM 109 may include computer readable instructions that when executed cause authentication device to establish a PAC binding session with account management device 110 during OS runtime or in a pre-boot environment respectively.

In this regard, the OS agent instructions and/or PBAM instructions when executed may cause authentication device 101 to negotiate a secured or unsecured data communications channel with account management device 110 using a close and/or long range communications network, as appropriate. Once the communications channel is established, such instructions when executed may further cause authentication device 101 to transmit a PAC binding request to account management device 110. The PAC binding request may include information that identifies the user account to which a PAC is to be bound, such as a username, password, other account information, combinations thereof and the like. For the purposes of the present disclosure, the term "PAC first copy" is used to identify a PAC that is to be bound to a user account during a PAC binding (and in a PAC update operation, as described below).

Binding of a PAC to a user account may be facilitated by CAM 111 on account management device 110. In this regard, CAM 111 may include computer readable instructions that when executed by a processor cause account management device 110 to enter a PAC binding mode in response to receiving a PAC binding request from authentication device 101. In PAC binding mode, the CAM instructions when executed may cause the account management device to monitor for the receipt of a PAC first copy from authentication device 101 and to bind a received PAC first copy to the user account identified in the PAC binding request. In this regard, the OS agent instructions and/or PBAM instructions when executed may cause authentication device 101 to send a PAC first copy signal containing a PAC first copy to account management device 110.

Binding of a PAC to a user account may occur at any suitable time. For example, PAC binding may occur during the establishment of an account by a user or at later time. In some embodiments, a PAC is bound to a user account when the account is initially established. In other embodiments, a PAC may be bound to an account after the account is created. Regardless, account management device 110 may be configured to permit updating and/or change of the PAC that is bound to an account.

The PAC bound to a user account may be updated and/or changed in a similar manner as set forth above with respect to the initial binding of a PAC first copy to an account. For example, OS agent instructions and/or PBAM instructions may (e.g., in response to a user input) cause authentication device 101 to initiate a PAC update session with account management device 110. In particular, such instructions may cause the authentication device to negotiate a secure or unsecure data communications channel with account management device 110, within or outside of OS runtime, respectively. Once such communications channel has been established, the OS agent instructions and/or PBAM instructions may communicate a PAC update/change request to account management device 110.

In response to receiving a PAC update request, the CAM instructions when executed may cause account management device 110 to enter a PAC update/change mode, and monitor for the receipt of a PAC first copy from authentication device 101. Upon receipt, account management device may compare the received PAC first copy to the PAC first copy(ies) it has in its database, and thus identify the account to which the PAC update/change request is directed. The account management device may then notify authentication device 101 that it has identified the relevant account. At this point, account management device may monitor for receipt of a new/updated PAC from authentication device. Upon receipt of a new/updated PAC from authentication device 101, the CAM instructions when executed may cause account management device 110 to bind the new/updated PAC to the relevant user account as a new/updated PAC first copy. The previous PAC first copy bound to the account may be retained or deleted, as desired. Without limitation, the previous PAC first copy is preferably deleted.

Once a PAC first copy is bound to a user account, user access to the account may be restored using another copy of the PAC (hereinafter, a "PAC second copy") in an account restoration operation. In this regard, an account restoration operation may be initiated by OS agent 106 and/or PBAM 109, e.g., in response to a user input. For example OS agent instructions when executed may cause authentication device 101 to initiate an account restoration session with account management device 110 from within an OS runtime environment (i.e., during execution of OS 105). Alternatively, PBAM instructions may initiate an account restoration session with account management device 110 from a pre boot environment (i.e., prior to booting OS 105). Regardless of the environment from which the account restoration session is initiated, such instructions when executed may cause authentication device 101 to negotiate a secure or unsecure data communications channel with account management device 110 using a close and/or long range communications network, as appropriate.

Once the communication channel is established, the OS agent instructions and/or PBAM instructions when executed may cause authentication device 101 to transmit an account restoration request to account management device 110. In response to such request, computer readable CAM instructions within CAM 111 when executed may cause account management device 110 to enter an account restoration mode and monitor for the receipt of one or more PAC second copies from authentication device 101.

Before or after account management device 110 enters an account restoration mode, the OS agent instructions and/or PBAM instructions when executed may cause the authentication device to generate another copy of a PAC (i.e., a PAC second copy) that is associated with the account to be restored. In instances where authentication device 101 has maintained a copy of a relevant PAC in memory, the OS agent and/or PBAM instructions when executed may cause authentication device 101 to transmit a copy of the PAC (i.e. a PAC second copy) to account management device 110, e.g., in a PAC second copy transmission signal. Alternatively, in instances where authentication device 101 has not maintained a copy of a relevant PAC, the OS agent and/or PBAM instructions when executed may cause the authentication device to produce another copy of the PAC (i.e., to produce a PAC second copy) or to obtain a copy of the PAC from another source, such as another authentication device.

In any case, production of a PAC second copy by authentication device 101 may occur in the same or similar manner as described above with respect to the production of a PAC first copy. That is, a PAC second copy may be produced by authentication device 101 in an OS runtime environment or in a pre-boot environment based on identification indicia, user inputs, combinations thereof, and the like. Without limitation, the PAC second copy is preferably produced in a pre-boot environment, such as may be provided by a BIOS and/or UEFI interface, as described above. In some embodiments, the PAC second copy may be reproduced using the same inputs and indicia that were used to produce the PAC first copy, which may be stored in user profile, as previously described.

Once a PAC second copy is available, the OS agent and/or PBAM instructions when executed may cause authentication device 101 to transmit the PAC second copy to account management device 110 using a short and/or long range communications network, as appropriate. Transmission of the PAC second copy to account management device 110 may occur at any suitable time and in any suitable environment. For example, authentication device 101 may transmit a PAC second copy to an account management device during OS runtime. Alternatively or additionally, a PAC second copy may be transmitted to account management device 110 from authentication device 101 outside of OS runtime, such as during a pre boot operation.

In response to receiving the PAC second copy, the CAM instructions when executed may cause account management device 110 to validate the PAC second copy against the PAC first copy (or updated/new PAC) bound to the relevant user account. Any suitable process may be used to verify the PAC second copy to the PAC first copy. For example, the CAM instructions when executed may cause account management device 110 to determine whether the PAC second copy is identical to the PAC first copy.

If account management device 110 is able to successfully verify the PAC second copy against the PAC first copy, it may transmit account restoration information needed to restore access to the account in question, such as username, password, password reset information, combinations thereof, and the like. The account restoration information may be transmitted in any suitable fashion and to any suitable location. For example, account management device 110 may use its communications circuitry to transmit account restoration information to the authentication system using a short and/or long range communications network. Such information may be displayed by the authentication system in a user interface, such as a user interface provided by PBAM (i.e., in a pre-boot environment) or in a user interface provided by OS agent 106 (e.g., during OS runtime). Alternatively or additionally, account restoration information may be sent to an account that is accessible to the user, such as an alternative email account, instant messaging account, social network account, combinations thereof, and the like. Without limitation, the CAM instructions when executed preferably cause the account management device to send account restoration information the authentication device for display in a user interface provided by PBAM 109, i.e. in a pre-boot environment.

Figure 2:
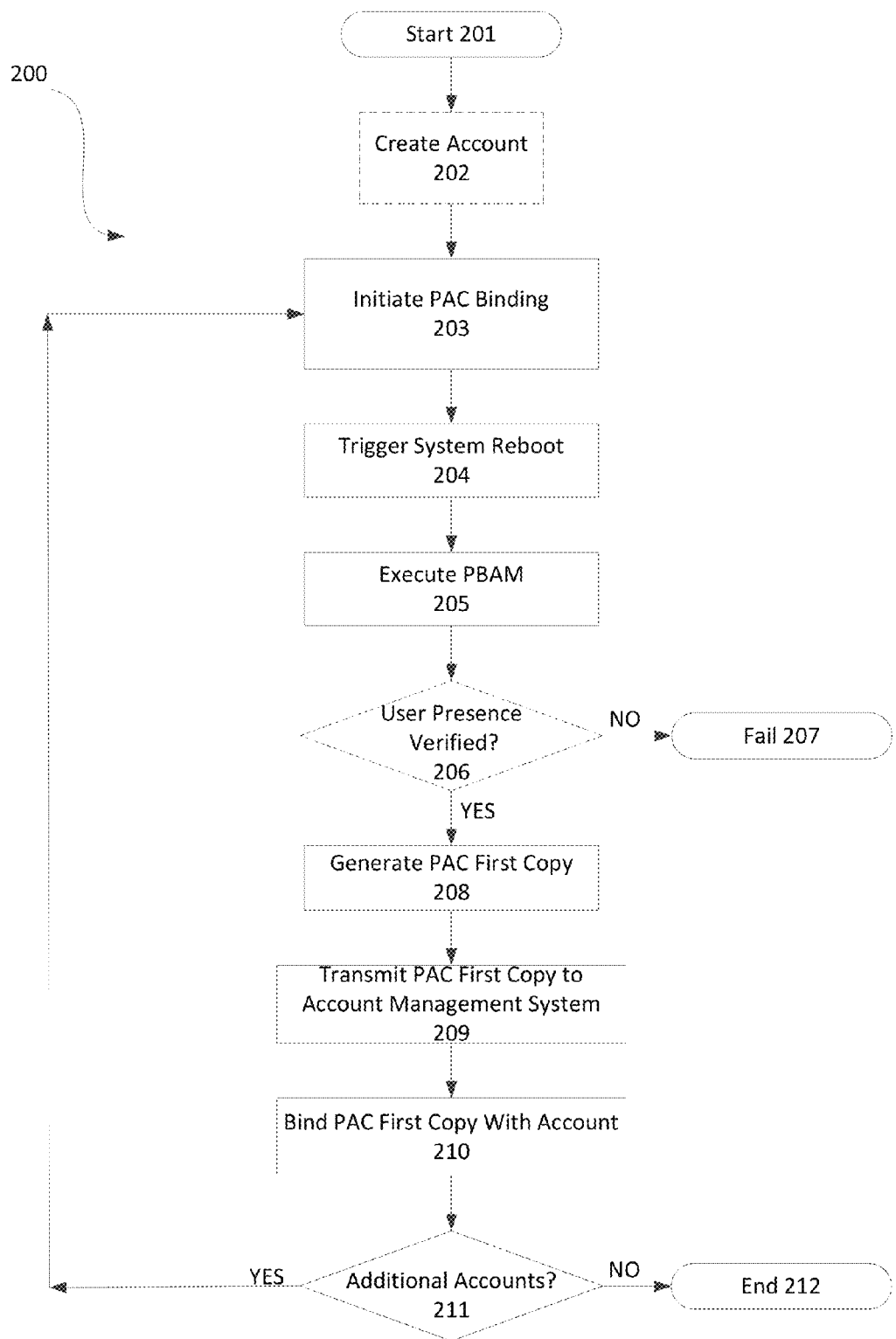
FIG. 2 is a flow diagram of an exemplary method of binding a platform attestation credential to a user account, consistent with the present disclosure.

Another aspect of the present disclosure relates to methods of binding a PAC to a user account. Reference is therefore made to FIG. 2, which depicts a flow diagram of an exemplary PAC binding method consistent with the present disclosure. As shown, method 200 begins at block 201. If a relevant user account is not present on an account management device of a service provider, the method may proceed to optional block 202 wherein a user account may be created. Once a relevant user account has been created, or if a user account is previously available, the method may proceed to block 203, wherein a PAC binding session with the account management device may be initiated by an authentication device consistent with the present disclosure.

As previously discussed, a PAC binding session may be initiated by an OS agent executed by an authentication device during OS runtime. As described above in connection with FIG. 1, initiation of a PAC binding session may include establishing a secure or unsecure data communications channel between an authentication device and an account management device. Alternatively or additionally, initiation of a PAC binding session may include transmitting a PAC binding request from an authentication device to an account management device. As noted previously, the PAC binding request may include information identifying the user account for which PAC binding is requested, and may cause the account management device to enter a PAC binding mode with respect to such account.

The method may then proceed to block 204, wherein the authentication device may be rebooted. Rebooting of the authentication device may be instigated by an OS agent executed within the OS runtime environment, or by another mechanism. In any case, the method may proceed to block 205, wherein a pre boot authentication module (PBAM) is executed from within a pre boot environment, such as may be provided by a BIOS and/or UEFI of an authentication device.

The method may then proceed to optional block 206, wherein user presence may be verified by a PBAM, as described above. For example, the PBAM may cause the authentication device to monitor for a detectable signal or other input that may signify the presence of a user. In some embodiments, the PBAM causes the authentication device to monitor for audio signals, keyboard inputs, entry of a personal identification number, combinations thereof, and the like. If user presence is not verified, the method may proceed to block 207, wherein the PAC binding operation fails.

If user presence is verified or is not required, method may proceed to block 208, wherein a PAC first copy may be generated by an authentication device from within a pre boot environment. As explained previously, a PAC first copy may be produced from identification indicia of the authentication device or its components, either alone or in combinations with user input. In any case, production of the PAC first copy from within a pre boot environment may protect the PAC first copy and/or PAC generation process from being compromised by a hacker, malware, or other unauthorized entity.

Once a PAC first copy has been generated, the method may proceed to block 209, wherein the PAC first copy may be transmitted to the account management device, e.g., in a PAC first copy transmission signal. As noted above, transmission of the PAC first copy to the account management device may occur during OS runtime, or from within a pre boot environment. Without limitation, transmission of the PAC first copy occurs from within a pre boot environment.

The method may then proceed to block 210, wherein the account management device binds the PAC first copy to the user account identified in the PAC binding request. The method may then proceed to block 211, wherein a determination may be made as to whether additional accounts are available and are to be bound to the PAC first copy or to another PAC. If so, the method may return to block 203, wherein a PAC binding request with respect to the additional account(s) may be sent by the authentication device to the account management device. The method may then repeat as stated above with respect to each additional account. If no further accounts are to be bound to a PAC first copy or another PAC, the method may proceed to block 212, and end.

Figure 3:
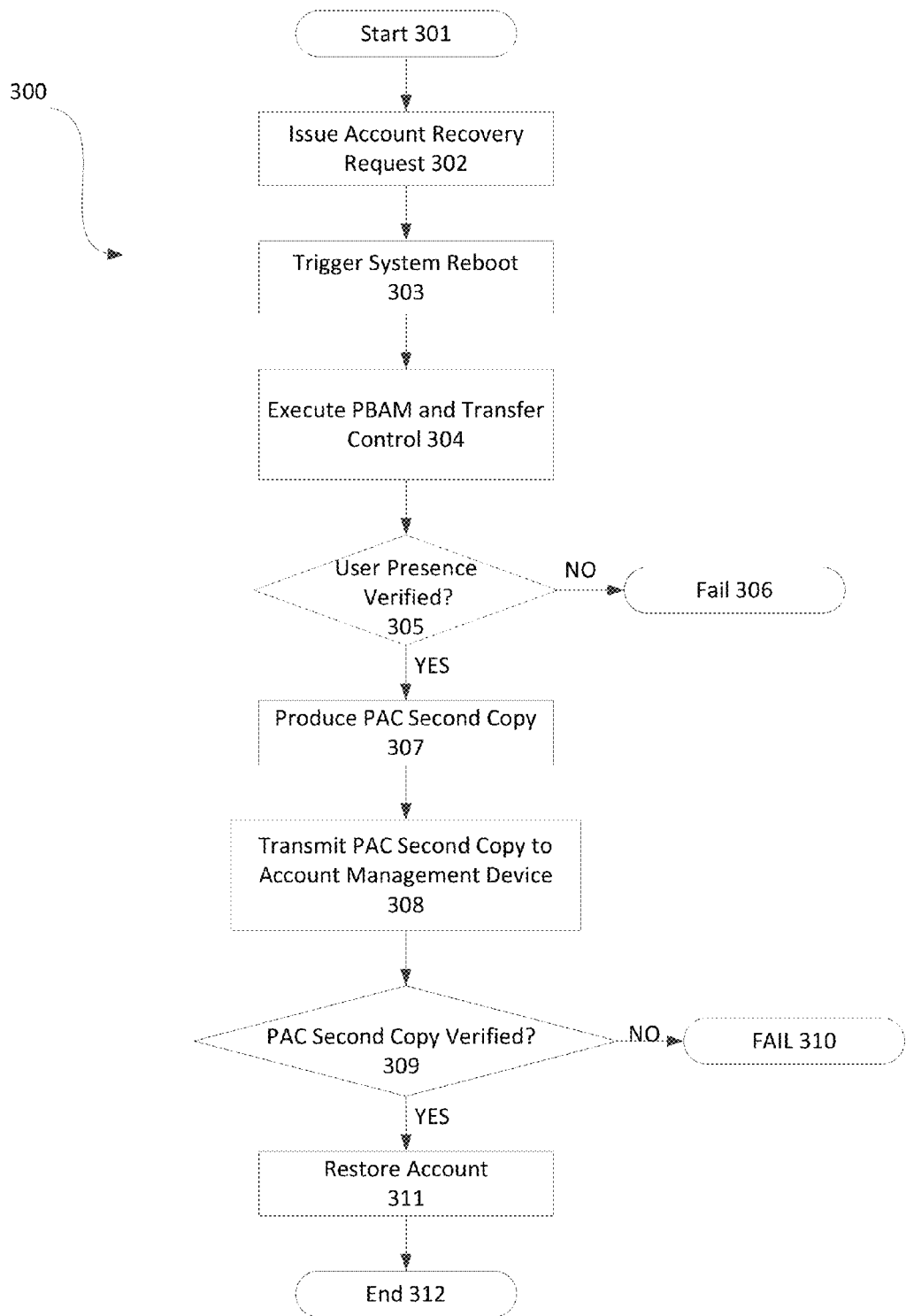
FIG. 3. is a flow diagram of an exemplary method of recovering an account, consistent with the present disclosure.

Another aspect of the present disclosure relates to methods of restoring access to a user account with a platform attestation credential. Reference is therefore made to FIG. 3, which depicts a flow diagram of an exemplary account restoration method consistent with the present disclosure. As shown, method 300 begins at block 301. At block 302, an account recovery operation is initiated. As noted previously, an account recovery operation may be initiated by an OS agent, e.g., in response a user input. The OS agent may cause an authentication device to communicate with an account management device to establish an account recovery session. For example, the authentication device may negotiate a secure or unsecure data communications channel with the account management device, and send an account restoration request to the account management device over such channel. The account restoration request may include information identifying the account for which restored access is requested. In response to such request, a credential authentication module on the account management device may cause the account management to enter an account recovery mode with respect to the account in question.

The method may then proceed to block 303, wherein the authentication device is rebooted. Rebooting of the authentication device may be instigated by the OS agent, as discussed above. During the reboot of the authentication device, the method may proceed to block 304, wherein control is transferred to a pre boot authentication module (PBAM). As explained previously, the PBAM may be executed in a pre-boot environment such as may be provided by a BIOS and/or UEFI.

After control is transferred to the PBAM, the method may proceed to optional block 305, wherein the PBAM may cause the authentication device to verify user/identity and/or presence, e.g., in the manner previously described above. If such verification fails, the method may proceed to block 306, whereupon the account restoration operation fails. If verification succeeds or is not required, the method may proceed to block 307, wherein the PBAM may cause the authentication device to produce a PAC second copy, i.e. a copy of a PAC first copy that was bound by the account management device to the user account for which restored access is requested. That is, the PBAM may cause the authentication device to produce a PAC second copy, either by duplicating a PAC first copy resident in a memory of the authentication device, or by producing the PAC second copy from the same combination of identifying indicia, user inputs, etc. that was used to produce the PAC first copy.

Once a PAC second copy is available, the method may proceed to block 308, wherein the PAC second copy is transmitted to the account management device. As noted previously, transmission of the PAC second copy may occur during OS runtime or in a pre-boot environment. In the former case, the PBAM may cause the authentication device to boot its operating system, and control may be transferred back to the OS agent. The OS agent may then communicate the PAC second copy to the account management device. In the latter case, the PBAM may cause the authentication device to transmit the PAC second copy from within the pre boot environment. In either case, the PAC second copy may be transmitted to the account management device in a PAC second copy transmission signal.

The method may then proceed to block 309, wherein the account management device verifies the PAC second copy against the PAC first copy bound to the user account in question. For example, the account management device may analyze the PAC second copy and determine whether it is identical to the PAC first copy. Regardless of the mode of verification, if the verification of the PAC second copy fails, the method may proceed to block 310, whereupon the account restoration operation fails. But if verification of the PAC second copy succeeds, the method may proceed to block 311, whereupon the account management device may restore access to the user account in question.

As noted above, the account management device may restore access to the user account in question by sending account access information to the authentication device, to an account that is accessible by a user, or to another location. Once account restoration information is transmitted by the account management device, the method may proceed to block 312 and end.

One example of the present disclosure is an authentication device. The authentication device includes a processor; communications circuitry; a first memory having an operating system (OS) agent module stored thereon, the OS agent module including computer readable OS agent instructions that are executable by the processor from within a OS runtime environment of the authentication device; and a second memory having a pre boot authentication module (PBAM) stored thereon, the PBAM including computer readable instructions that are executable by the processor from within a pre boot environment of the authentication device; wherein the OS agent instructions are configured to cause the authentication device to reboot and transfer control to the PBAM within the pre boot environment; and the PBAM is configured to perform the following operations within the pre-boot environment: producing a platform authentication credential (PAC) from within the pre boot environment of the authentication device; and transmitting a copy of the PAC to an account management device that manages access to a user account.

Another exemplary authentication device includes any or all of the foregoing components, wherein the OS agent module is further configured to cause the authentication device to transmit a PAC binding request to the account management device, the PAC binding request configured to cause the account management device to enter a PAC binding mode with respect to the user account.

Another exemplary authentication device includes any or all of the foregoing components, wherein transmitting a copy of the PAC includes transmitting a first copy of the PAC in a PAC first copy signal, the PAC first copy signal configured to cause the account management device to bind the first copy of the PAC to the user account.

Another exemplary authentication device includes any or all of the foregoing components, wherein the PBAM is configured to cause the authentication device to transmit the PAC first copy signal to the account management device from within the pre boot environment. Another exemplary authentication device includes any or all of the foregoing components, wherein the PBAM is further configured to cause the authentication device to reboot an operating system of the authentication device to establish the OS runtime environment, and transfer control to the OS agent module; and the OS agent module is further configured to cause the authentication device to transmit the PAC first copy signal to the account management device from within the OS runtime environment Another exemplary authentication device includes any or all of the foregoing components, wherein the PBAM is further configured to cause the authentication device to produce the PAC within the pre-boot environment from identifying indicia specific to the authentication device.

Another exemplary authentication device includes any or all of the foregoing components, wherein the identifying indicia specific to the authentication device is chosen from at least one of a main firmware footprint of the authentication device, a processor identification number of the processor, a serial number of a video display component of the authentication device, a trusted platform module (TPM) key of a trusted platform module of the authentication device, a media access control (MAC) address, a mobile identifier, and combinations thereof.

Another exemplary authentication device includes any or all of the foregoing components, wherein transmitting a copy of the PAC to the account management device includes transmitting a second copy of the PAC in a PAC second copy signal, the PAC second copy signal being configured to cause the account management device to verify the second copy of the PAC against a first copy of the PAC bound to a user account, and transmit account restoration information for the user account if verification of the second copy against the first copy succeeds.

Another exemplary authentication device includes any or all of the foregoing components, wherein the PBAM is further configured to cause the authentication device to transmit the PAC second copy signal to the account management device from within the pre boot environment.

Another exemplary authentication device includes any or all of the foregoing components, wherein the PBAM is further configured to cause the authentication device to reboot an operating system of the authentication device to establish the OS runtime environment, and transfer control to the OS agent module; and the OS agent module is further configured to cause the authentication device to transmit the PAC second copy signal to the account management device from within the OS runtime environment.

Another example of the present disclosure is an account management device, including: a processor; communications circuitry; and a memory having a credential authentication module (CAM) stored thereon, the CAM configured to cause the account management device to perform the following operations including: managing access to a user account; in response to receiving a platform authentication credential (PAC) binding request, entering a PAC binding mode and monitor for receipt of a first copy of a PAC; and upon receipt of the PAC first copy, binding the PAC first copy to the user account.

Another exemplary account management device includes any or all of the foregoing components, wherein the CAM is further configured to cause the account management device to perform the following operations including: in response to receiving an account restoration request, entering an account restoration mode and monitor for receipt of a second copy of the PAC; in response to receiving a second copy of the PAC, verifying the second copy of the PAC against the first copy of the PAC; and if the verification of the second copy succeeds, transmitting account restoration information for the user account.

Another exemplary account management device includes any or all of the foregoing components, wherein the CAM is further configured to cause the account management device to transmit the account restoration information to an authorization device.

Another exemplary account management device includes any or all of the foregoing components, wherein the CAM is further configured to cause the account management device to perform the following operations including: in response to receiving a PAC update request targeting the user account, entering a PAC update mode and monitoring for receipt of an updated PAC, the updated PAC differing from the first copy of the PAC bound to the user account; and in response to receiving the updated PAC, binding the updated PAC to the user account.

Another example of the present disclosure is a method including: initiating from within an OS runtime environment of an authentication device a platform authentication credential (PAC) binding session with an account management device that manages access to a user account; rebooting the authentication device and instigating a pre boot environment of the authentication device; generating a PAC within the pre boot environment; and transmitting a copy of the PAC to the account management device.

Another exemplary method includes any or all of the foregoing components, and further includes transmitting a PAC binding request during the OS runtime environment to the account management device, the PAC binding request configured to cause the account management device to enter a PAC binding mode with respect to the user account.

Another exemplary method includes any or all of the foregoing components, wherein transmitting a copy of the PAC to the account management device comprises transmitting a first copy of the PAC, and the method further comprises binding the first copy of the PAC to the user account.

Another exemplary method includes any or all of the foregoing components, wherein transmitting a copy of the PAC to the account management device includes transmitting a first copy of the PAC, and the method further includes binding the first copy of the PAC to the user account.

Another exemplary method includes any or all of the foregoing components, wherein the first copy of the PAC is transmitted from within the OS runtime environment or from within the pre boot environment of the authentication device.

Another exemplary method includes any or all of the foregoing components, wherein the authentication device produces the PAC from identifying indicia specific to the authentication device Another exemplary method includes any or all of the foregoing components, wherein the identifying indicia specific to the authentication device is chosen from at least one of a main firmware footprint of the authentication device, a processor identification number of the processor, a serial number of a video display component of the authentication device, a trusted platform module (TPM) key of a trusted platform module of the authentication device, a media access control (MAC) address, a mobile identifier, and combinations thereof.

Another exemplary method includes any or all of the foregoing components, wherein transmitting a copy of the PAC to the account management device comprises transmitting a second copy of the PAC, and the method further includes: verifying with the account management device the second copy of the PAC against a first copy of the PAC bound to the user account; and transmitting account restoration information for the user account with the account management device if verification of the second copy against the first copy succeeds.

Another exemplary method includes any or all of the foregoing components, wherein the second copy of the PAC is transmitted to the account management device from within the pre boot environment or from within the OS runtime environment.

Another example of the present disclosure is at least one computer readable medium having pre boot authentication module (PBAM) instructions stored therein, wherein the PBAM instructions when executed by a processor of an authentication device cause the processor to perform the following operations including: produce a platform authentication credential (PAC) within a pre boot environment of the authentication device; and transmit a copy of the PAC to an account management device that manages access to a user account.

Another exemplary at least one computer readable medium includes any or all of the foregoing components, wherein the PBAM instructions when executed further cause the processor to transmit a PAC binding request to the account management device, the PAC binding request configured to cause the account management device to enter a PAC binding mode with respect to the user account.

Another exemplary at least one computer readable medium includes any or all of the foregoing components, wherein the transmit a copy of the PAC to the account management device comprises transmitting a first copy of the PAC in a PAC first copy signal, the PAC first copy signal configured to cause the account management device to bind the first copy of the PAC to the user account.

Another exemplary at least one computer readable medium includes any or all of the foregoing components, wherein the PBAM instructions when executed further cause the processor to transmit the PAC first copy signal to the account management device from within the pre boot environment.

Another exemplary at least one computer readable medium includes any or all of the foregoing components, wherein the PBAM instructions when executed further cause the processor to reboot an operating system of the authentication device to establish the OS runtime environment, and transmit the PAC first copy signal to the account management device from within the OS runtime environment.

Another exemplary at least one computer readable medium includes any or all of the foregoing components, wherein the PBAM instructions when executed further cause the processor to produce the PAC from identifying indicia specific to the authentication device.

Another exemplary at least one computer readable medium includes any or all of the foregoing components, wherein the identifying indicia specific to the authentication device is chosen from at least one of a main firmware footprint of the authentication device, a processor identification number of the processor, a serial number of a video display component of the authentication device, a trusted platform module (TPM) key of a trusted platform module of the authentication device, a media access control (MAC) address, a mobile identifier, and combinations thereof.

Another exemplary at least one computer readable medium includes any or all of the foregoing components, wherein transmit a copy of the PAC to the account management device includes transmitting a second copy of the PAC in a PAC second copy signal, the PAC second copy signal being configured to cause the account management device to verify the second copy of the PAC against a first copy of the PAC bound to a user account, and to transmit account restoration information for the user account if verification of the second copy against the first copy succeeds.

Another exemplary at least one computer readable medium includes any or all of the foregoing components, wherein the PBAM instructions when executed further cause the processor to transmit the PAC second copy signal to the account management device from within the pre boot environment.

Another exemplary at least one computer readable medium includes any or all of the foregoing components, wherein the PBAM instructions when executed further cause the processor to reboot an operating system of the authentication device to establish the OS runtime environment; and transmit the PAC second copy signal to the account management device from within the OS runtime environment.

Another example of the present disclosure is at least one computer readable medium having credential authentication module (PBAM) instructions stored therein, wherein the CAM instructions when executed by a processor of an account management device cause the processor to perform the following operations including: manage access to a user account; in response to receiving a platform authentication credential (PAC) binding request from an authentication device, enter a PAC binding mode and monitor for receipt of a first copy of a PAC; and upon receipt of the PAC first copy, bind the PAC first copy to the user account.

Another exemplary at least one computer readable medium includes any or all of the foregoing components, wherein the CAM instructions when executed further cause the processor to: in response to receiving an account restoration request from an authentication device, enter an account restoration mode and monitor for receipt of a second copy of the PAC; in response to receiving a second copy of the PAC, verify the second copy of the PAC against the first copy of the PAC; and if the verification of the second copy succeeds, transmit account restoration information for the user account.

Another exemplary at least one computer readable medium includes any or all of the foregoing components, wherein the CAM instructions when executed further cause the processor to transmit the account restoration information to the authorization device.

Another exemplary at least one computer readable medium includes any or all of the foregoing components, wherein the CAM instructions when executed further cause the processor to: in response to receiving a PAC update request targeting the user account, enter a PAC update mode and monitor for receipt of an updated PAC, the updated PAC differing from the first copy of the PAC bound to the user account; in response to receiving the updated PAC, binding the updated PAC to the user account.

Another example of the present disclosure is at least one computer readable medium including means for performing one or more method operations described herein.

Another example of the present disclosure is a system including means for performing one or more method operations described herein.

Another example of the present disclosure is a system including an authentication device including: a processor; communications circuitry; a first memory having an operating system (OS) agent module stored thereon, the OS agent module including computer readable OS agent instructions that are executable by the processor from within a OS runtime environment of the authentication device; and a second memory having a pre boot authentication module (PBAM) stored thereon, the PBAM including computer readable instructions that are executable by the processor from within a pre boot environment of the authentication device; wherein the OS agent instructions are configured to cause the authentication device to reboot and transfer control to the PBAM within the pre boot environment; and the PBAM is configured to perform the following operations within the pre-boot environment: producing a platform authentication credential (PAC) from within the pre boot environment of the authentication device; and transmitting a copy of the PAC to an account management device that manages access to a user account.

Another example system of the present disclosure includes any or all of the foregoing components, wherein the OS agent module is further configured to cause the authentication device to transmit a PAC binding request to the account management device, the PAC binding request configured to cause the account management device to enter a PAC binding mode with respect to the user account.

Another example system of the present disclosure includes any or all of the foregoing components, wherein the PBAM is configured to cause the authentication device to transmit a copy of the PAC to the account management device includes transmitting a first copy of the PAC in a PAC first copy signal, the PAC first copy signal configured to cause the account management device to bind the first copy of the PAC to the user account.

Another example system of the present disclosure includes any or all of the foregoing components, wherein the PBAM is configured to cause the authentication device to transmit the PAC first copy signal to the account management device from within the pre boot environment.

Another example system of the present disclosure includes any or all of the foregoing components, wherein: the PBAM is further configured to cause the authentication device to reboot an operating system of the authentication device to establish the OS runtime environment, and transfer control to the OS agent module; and the OS agent module is further configured to cause the authentication device to transmit the PAC first copy signal to the account management device from within the OS runtime environment.

Another example system of the present disclosure includes any or all of the foregoing components, wherein the PBAM is further configured to cause the authentication device to produce the PAC within the pre-boot environment from identifying indicia specific to the authentication device.

Another example system of the present disclosure includes any or all of the foregoing components, wherein the identifying indicia specific to the authentication device is chosen from at least one of a main firmware footprint of the authentication device, a processor identification number of the processor, a serial number of a video display component of the authentication device, a trusted platform module (TPM) key of a trusted platform module of the authentication device, a media access control (MAC) address, a mobile identifier, and combinations thereof.

Another example system of the present disclosure includes any or all of the foregoing components, wherein transmitting a copy of the PAC to the account management device includes transmitting a second copy of the PAC in a PAC second copy signal, the PAC second copy signal being configured to cause the account management device to verify the second copy of the PAC against a first copy of the PAC bound to a user account, and transmit account restoration information for the user account if verification of the second copy against the first copy succeeds.

Another example system of the present disclosure includes any or all of the foregoing components, wherein the PBAM is further configured to cause the authentication device to transmit the PAC second copy signal to the account management device from within the pre boot environment.

Another example system of the present disclosure includes any or all of the foregoing components, wherein the PBAM is further configured to cause the authentication device to reboot an operating system of the authentication device to establish the OS runtime environment, and transfer control to the OS agent module; and the OS agent module is further configured to cause the authentication device to transmit the PAC second copy signal to the account management device from within the OS runtime environment.

Another example of the present disclosure is a system including an account management device, wherein the account management device includes: a processor; communications circuitry; and a memory having a credential authentication module (CAM) stored thereon, the CAM configured to cause the account management device to perform the following operations including: managing access to a user account; in response to receiving a platform authentication credential (PAC) binding request, entering a PAC binding mode and monitor for receipt of a first copy of a PAC; and upon receipt of the PAC first copy, binding the PAC first copy to the user account.

Another example system includes any or all of the foregoing components, wherein the CAM is further configured to cause the account management device to perform the following operations including: in response to receiving an account restoration request, entering an account restoration mode and monitor for receipt of a second copy of the PAC; in response to receiving a second copy of the PAC, verifying the second copy of the PAC against the first copy of the PAC; and if the verification of the second copy succeeds, transmitting account restoration information for the user account.

Another example system includes any or all of the foregoing components, wherein the CAM is further configured to cause the account management device to transmit the account restoration information to an authorization device.

Another example system includes any or all of the foregoing components wherein the CAM is further configured to cause the account management device to perform the following operations including: in response to receiving a PAC update request targeting the user account, entering a PAC update mode and monitoring for receipt of an updated PAC, the updated PAC differing from the first copy of the PAC bound to the user account; and in response to receiving the updated PAC, binding the updated PAC to the user account.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications

What is claimed is:

1. An authentication device, comprising:
    a processor;
    communications circuitry;
    a first memory having an operating system (OS) agent module stored thereon, said OS agent module comprising computer readable OS agent instructions that are executable by said processor from within a OS runtime environment of said authentication device; and
    a second memory having a pre boot authentication module (PBAM) stored thereon, said PBAM comprising computer readable instructions that are executable by said processor from within a pre boot environment of said authentication device;
    wherein said OS agent instructions are configured to cause said authentication device to reboot and transfer control to said PBAM within said pre boot environment; and
    said PBAM is configured to perform the following operations within said pre-boot environment:
        producing a platform authentication credential (PAC) from within said pre boot environment of said authentication device, said PAC based on identifying indicia specific to said authentication device;
        transmitting a copy of said PAC to an account management device that manages access to a user account; and
        cause said authentication device to reboot said operating system to establish said OS runtime environment and transfer control to said OS agent module.

2. The authentication device of claim 1, wherein said OS agent module is further configured to cause said authentication device to transmit a PAC binding request to said account management device, said PAC binding request configured to cause said account management device to enter a PAC binding mode with respect to said user account.

3. The authentication device of claim 1, wherein transmitting a copy of said PAC comprises transmitting a first copy of said PAC in a PAC first copy signal, said PAC first copy signal configured to cause said account management device to bind said first copy of said PAC to said user account.

4. The authentication device of claim 1, wherein said identifying indicia is chosen from at least one of a main firmware footprint of said authentication device, a processor identification number of said processor, a serial number of a video display component of said authentication device, a trusted platform module (TPM) key of a trusted platform module of said authentication device, a media access control (MAC) address, a mobile identifier, and combinations thereof.

5. The authentication device of claim 1, wherein transmitting a copy of said PAC to said account management device comprises transmitting a second copy of said PAC in a PAC second copy signal, said PAC second copy signal being configured to cause said account management device to verify said second copy of said PAC against a first copy of said PAC bound to a user account, and transmit account restoration information for said user account when verification of said second copy against said first copy succeeds.

6. The authentication device of claim 5, wherein said PBAM is further configured to cause said authentication device to transmit said PAC second copy signal to said account management device from within said pre boot environment.

7. The authentication device of claim 1, wherein said OS agent module is further configured to cause said authentication device to transmit said PAC second copy signal to said account management device from within said OS runtime environment.

8. The authentication device of claim 1, wherein said PAC is based on identifying indicia specific to said authentication device.

9. A method, comprising:
    with an operating system (OS) agent module stored in a first memory of an authentication device, initiating from within an OS runtime environment of the authentication device a platform authentication credential (PAC) binding session with an account management device that manages access to a user account;
    rebooting an operating system of said authentication device to establish a pre boot environment of said authentication device; and
    with a pre boot authentication module (PBAM) stored in a second memory of the authentication device:
        generating a PAC within said pre boot environment, said PAC based on identifying indicia specific to said authentication device;
        transmitting a copy of said PAC to said account management device; and
        causing said authentication device to reboot said operating system to establish said OS runtime environment and transfer control to said OS agent module.

10. The method of claim 9, further comprising transmitting a PAC binding request during said OS runtime environment to said account management device, said PAC binding request configured to cause said account management device to enter a PAC binding mode with respect to said user account.

11. The method of claim 10, wherein transmitting a copy of said PAC to said account management device comprises transmitting a first copy of said PAC in a PAC first copy signal that is configured to cause said account management device to bind said first copy of said PAC to said user account.

12. The method of claim 9, wherein said identifying indicia is chosen from at least one of a main firmware footprint of said authentication device, a processor identification number of said processor, a serial number of a video display component of said authentication device, a trusted platform module (TPM) key of a trusted platform module of said authentication device, a media access control (MAC) address, a mobile identifier, and combinations thereof.

13. The method of claim 9, wherein transmitting a copy of said PAC to said account management device comprises transmitting a second copy of said PAC in a PAC second copy signal, the PAC second copy signal being configured to cause said account management device to verify said second copy of said PAC against a first copy of said PAC bound to a user account, and to transmit account restoration information for said user account when verification of said second copy against said first copy succeeds.

14. One or more non-transitory computer readable memories having computer readable instructions stored therein, wherein said instructions when executed by a processor of an authentication device cause the processor to perform the following operations comprising:
  with an operating system (OS) agent module stored in first memory of an authentication device, initiating from within an OS runtime environment of the authentication device a platform authentication credential (PAC) binding session with an account management device that manages access to a user account;
  rebooting an operating system of said authentication device to establish a pre boot environment of said authentication device; and
  with a pre boot authentication module (PBAM) stored in a second memory of the authentication device:
    generating a PAC within said pre-boot environment, said PAC based on identifying indicia specific to said authentication device;
    transmitting a copy of aid PAC to said account management device; and
    causing said authentication device to reboot said operating system to establish said OS runtime environment and transfer control to said OS agent module.

15. The one or more non-transitory computer readable memories of claim 14, wherein said instructions when executed further cause said processor to transmit a PAC binding request to said account management device, said PAC binding request configured to cause said account management device to enter a PAC binding mode with respect to said user account.

16. The one or more non-transitory computer readable memories of claim 14, wherein transmitting a copy of said PAC to said account management device comprises transmitting a first copy of said PAC in a PAC first copy signal, said PAC first copy signal configured to cause said account management device to bind said first copy of said PAC to said user account.

17. The one or more non-transitory computer readable memories of claim 14, wherein said identifying indicia is at least one of a main firmware footprint of said authentication device, a processor identification number of said processor, a serial number of a video display component of said authentication device, a trusted platform module (TPM) key of a trusted platform module of said authentication device, a media access control (MAC) address, a mobile identifier, and combinations thereof.

18. The one or more non-transitory computer readable memories of claim 14, wherein transmitting a copy of said PAC to said account management device comprises transmitting a second copy of said PAC in a PAC second copy signal, said PAC second copy signal being configured to cause said account management device to verify said second copy of said PAC against a first copy of said PAC bound to a user account, and transmit account restoration information for said user account when verification of said second copy against said first copy succeeds.

19. The authentication device of claim 1, wherein said PAC is further based on user input, said user input comprising at least one of a keystroke pattern, one or more passwords, biometric information, or account information.

20. The method of claim 9, wherein said PAC is further based on user input, said user input comprising at least one of a keystroke pattern, one or more passwords, biometric information, or account information.

21. The one or more non-transitory computer readable memories of claim 14, wherein said PAC is further based on user input, said user input comprising at least one of a keystroke pattern, one or more passwords, biometric information, or account information.

* * * * *